US 6,567,859 B1

(12) United States Patent
Yang et al.

(10) Patent No.: US 6,567,859 B1
(45) Date of Patent: May 20, 2003

(54) DEVICE FOR TRANSLATING MEDIUM ACCESS CONTROL DEPENDENT DESCRIPTORS FOR A HIGH PERFORMANCE NETWORK

(75) Inventors: Li-Jau (Steven) Yang, San Jose, CA (US); Rich Traber, Fremont, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/300,296

(22) Filed: Apr. 27, 1999

(51) Int. Cl.$^7$ .............................................. G06F 15/16
(52) U.S. Cl. ...................... 709/250; 709/225; 709/230; 711/26
(58) Field of Search ............................... 709/230, 225, 709/250; 370/410; 710/26–28; 711/4

(56) References Cited

U.S. PATENT DOCUMENTS 5,560,038 A * 9/1996 Haddock .................... 395/800
5,748,905 A * 5/1998 Hauser et al. ............ 395/200.79
5,758,075 A * 5/1998 Graziano et al. .......... 395/200.8
5,937,169 A * 8/1999 Connery et al. ........... 395/200.8

* cited by examiner

Primary Examiner—Zarni Maung
Assistant Examiner—Jinsong Hu
(74) Attorney, Agent, or Firm—Wagner, Murabito & Hao LLP

(57) ABSTRACT

A device for translating medium access control (MAC) dependent descriptors for a high performance network interface card. Specifically, one embodiment of the present invention includes a circuit for translating a medium access control descriptor from a first format into a second format. The circuit includes a translator circuit coupled to receive a descriptor which corresponds to data stored within a memory. Specifically, the translator circuit translates the descriptor from a first descriptor format into a second descriptor format. Furthermore, the circuit includes a medium access control (MAC) circuit coupled to the translator circuit to receive the descriptor in the second descriptor format. More specifically, the medium access control circuit uses the descriptor in the second descriptor format to retrieve the data from the memory.

25 Claims, 6 Drawing Sheets

DEVICE FOR TRANSLATING MEDIUM ACCESS CONTROL DEPENDENT DESCRIPTORS FOR A HIGH PERFORMANCE NETWORK

TECHNICAL FIELD

The present invention generally relates to the field of computer networking. More particularly, the present invention relates to the field of descriptors corresponding to a medium access control (MAC) device of a network interface card.

BACKGROUND ART

Computers have become an integral tool used in a wide variety of different applications, such as in finance and commercial transactions, computer-aided design and manufacturing, health care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via electronic mail (e-mail) and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

Typically, NICs are also used to communicate over a LAN communications network standard referred to as Ethernet. When large amounts of data or data files are transmitted using Ethernet, a Transmission Control Protocol (TCP) segmentation process is typically run on a central processor unit (CPU) of a host computer in order to break the data down into transmission frames. For example, Ethernet has a maximum transmission frame size of 1514 bytes. Of the 1514 bytes of the transmission frame, there are a lot of bytes which are used for overhead. For instance, some bytes are used for addressing, other bytes are used for header information, etc. As such, the bytes remaining for the actual payload of data within each transmission frame are considerably less (e.g., 1460 bytes) than the 1514 bytes. It should be appreciated that there are disadvantages associated with this prior art process of segmenting data for transmission over a network.

One of the main disadvantages of this prior art segmentation process occurs as Ethernet network speed becomes ever faster (e.g., gigabit levels). At these high network speeds, the TCP segmentation process performed by the processor of the host computer becomes a bottleneck of the critical performance path, thereby slowing down the data throughput of the NIC. In other words, the processor becomes a bottleneck for data throughput of the NIC when used at high network speeds.

One of the prior art solutions for improving the throughput of the NIC is to implement an embedded processor onto the NIC in order to specifically perform the TCP segmentation process. In this manner, a large majority of the segmentation process is removed from the processor of the host computer and moved onto the embedded processor of the NIC. This prior art solution does improve the throughput of the NIC, but there are disadvantages associated with this prior art solution.

One of the main disadvantages of this prior art solution is that it does not effectively solve the problem of data throughput of a NIC when used with high speed networks (e.g., gigabit levels). Basically, the embedded processor of the NIC now becomes the bottleneck of the critical performance path thereby slowing down the data throughput of the NIC. In other words, the bottleneck for data throughput of the NIC is moved from the host processor to the processor of the NIC.

It should be appreciated that there is another disadvantage associated with the prior art TCP segmentation process, described above. As part of the prior art TCP segmentation process, descriptors are typically used to describe where particular data is stored within a memory device. The problem is that different descriptors are used for different medium access control (MAC) circuits which are part of a NIC. As such, a great majority of MAC descriptors are incompatible with different MAC circuits.

Accordingly, a need exists for a method and system for providing significantly improved data throughput of a network interface card which is used with a high speed network (e.g., gigabit levels). A further need exists for a method and system which meets the above need and provides a descriptor which can be tailored to a corresponding MAC device.

DISCLOSURE OF THE INVENTION

The present invention provides a method and system for providing significantly improved data throughput of a connection card which is used with a high speed network (e.g., gigabit levels). Moreover, the present invention provides a method and system which achieves the above accomplishment and provides a descriptor which can be tailored to a corresponding MAC device.

Specifically, one embodiment of the present invention includes a circuit for translating a medium access control descriptor from a first format into a second format. The circuit includes a translator circuit coupled to receive a descriptor which corresponds to data stored within a memory. Specifically, the translator circuit translates the descriptor from a first descriptor format into a second descriptor format. Furthermore, the circuit includes a medium access control (MAC) circuit coupled to the translator circuit to receive the descriptor in the second descriptor format. More specifically, the medium access control circuit uses the descriptor in the second descriptor format to retrieve the data from the memory.

In another embodiment, the present invention includes a circuit for translating a medium access control descriptor from a first format into a second format. The circuit includes a translator circuit coupled to receive a descriptor which corresponds to data stored within a local memory. The translator circuit translates the descriptor from a first descriptor format into a second descriptor format. Moreover, the circuit also includes a medium access control (MAC) circuit coupled to the translator circuit to receive the descriptor in the second descriptor format. The medium access control circuit uses the descriptor in the second descriptor format to retrieve the data from the local memory.

In still another embodiment, the present invention includes a method for translating a medium access control descriptor from a first format into a second format. The method includes the step of receiving a descriptor which corresponds to data stored within a memory. Furthermore, the method also includes the step of translating the descriptor from a first descriptor format into a second descriptor format. Additionally, the method includes the step of retrieving the data from the memory.

In yet another embodiment, the present invention includes the steps of the method described above and further includes the step of transmitting the data.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
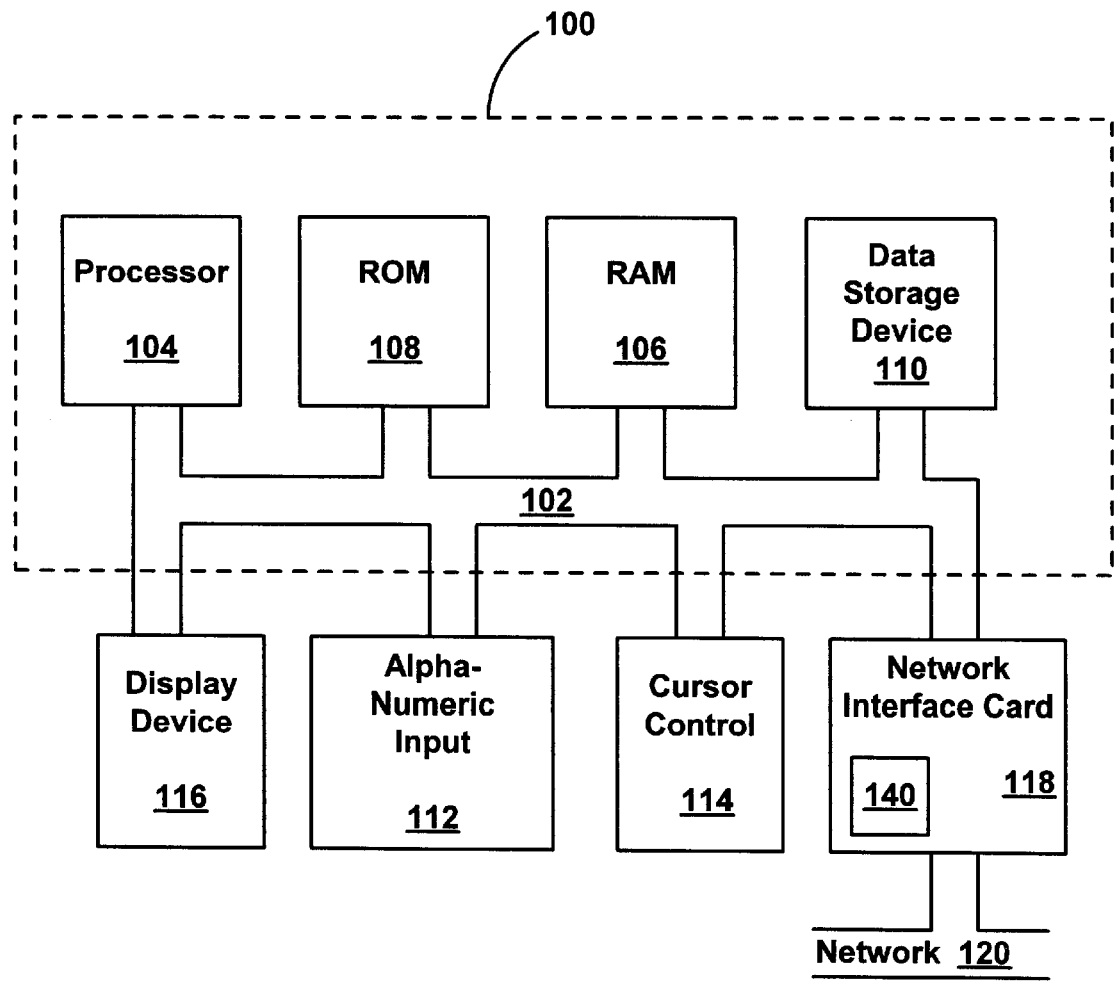
FIG. 1 is a schematic diagram of an exemplary computer system used to perform steps of the present method in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "translating", "retrieving", "transmitting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is exemplary only and that the present invention can operate within a number of different computer systems including general purpose networked computer systems, embedded computer systems, and stand alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor or any other type of processor. System 100 also includes data storage features such as a computer usable volatile memory 106, e.g., random access memory (RAM), coupled to bus 102 for storing information and instructions for central processor unit 104, computer usable non-volatile memory 108, e.g., read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112, which includes alphanumeric and function keys, is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a mouse, trackball, touch pad, joystick or special keys on alphanumeric input device 112 capable of signaling movement of a given direction or manner of displacement. Alternatively, it is appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

With reference still to FIG. 1, significantly, a network interface card (NIC) 118 coupled to bus 102 is connected to a network 120 and controls the flow of information of computer system 100 over network 120. Data packets, such as Ethernet packets, that are incoming and outgoing via network 120 are transmitted and received by a Medium Access Control (MAC) circuit 140 of NIC 118. A more detailed discussion of NIC 118 in furtherance of the present invention is found below.

DETAILED DESCRIPTION OF THE STRUCTURE AND OPERATION OF THE PRESENT INVENTION

Figure 2:
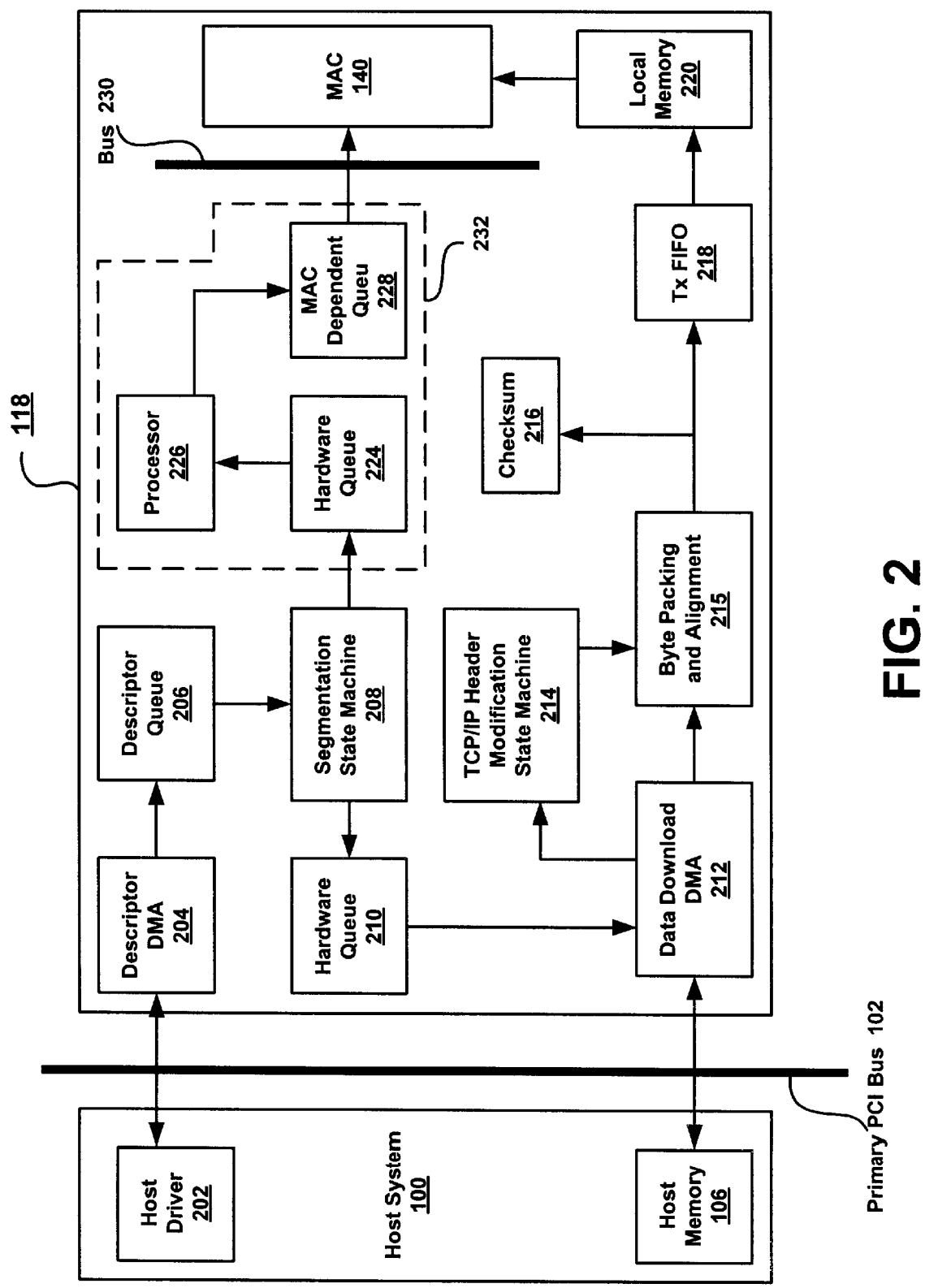
FIG. 2 is a schematic diagram of a network interface card, in accordance with one embodiment of the present invention, coupled to a host computer system.

With reference now to FIG. 2, a schematic diagram of a host computer system 100 having a network interface card 118 coupled thereto is shown. One of the main purposes of the different hardware components of network interface card 118, of the present embodiment, is to perform all of the transmission control protocol (TCP) segmentation process. In this manner, the segmentation process is removed from processor 104 of computer system 100, thereby significantly reducing its segmentation process utilization and allowing processor 104 to be utilized for other processes. Furthermore, in this fashion, the data throughput of network interface card 118 is able to function at high wire speeds (e.g., gigabit levels).

In the following description of embodiments of the present invention, the network interface card is a peripheral component. Although the present embodiments specifically recite a network interface card, the present invention is also well suited to an embodiment employing various other peripheral components. That is, the present invention is well suited to an embodiment in which the peripheral component is, for example, a PCMCIA (personal computer memory card international association) card. Similarly, the present invention is well suited to an embodiment in which the peripheral component is, for example, a compact form factor I/O (input/output) card. Additionally, the present invention is well suited to use in an embodiment in which the peripheral component is, for example, a rate controller, a small computer system interface (SCSI) controller, a graphics card, and the like. Furthermore, the present invention is well suited to be use, for example, in a non-peripheral component environment such as an application specific integrated circuit (ASIC) disposed on a motherboard, an embedded circuit, and the like.

Referring to FIG. 2, a host driver 202 running on processor 104 (FIG. 1) of host system 100 is responsible for creating a descriptor for a data file stored within host memory 106 which is to be eventually transferred by network interface card (NIC) 118 over network 120. The descriptor includes information about where the data file is stored within host memory 106, the size of the data file, along with other information. Furthermore, host driver 202 prepares a list of these descriptors and makes them available to a descriptor direct memory access (DMA) circuit 204 by updating a write pointer register (not shown). In the present embodiment, the descriptor DMA 204 is used by NIC 118 to access the descriptors created by host software. In accordance with the present embodiment, other methods may be used as well to access the descriptors. It is appreciated that descriptor DMA circuit 204, which is located on NIC 118, is coupled to Peripheral Component Interconnect (PCI) bus 102. It should be appreciated that bus 102 of the present embodiment can be any type of communication bus and is not limited to being a PCI bus.

More specifically, the descriptor structure prepared by host driver 202 consists of control words, fragment address, and fragment length. The control words contain packet related information and flags. It should be appreciated that the packet information and flags are well known by those of ordinary skill in the art.

It should be further appreciated that host driver 202 of FIG. 2 can make a request to protocol not to support Transmission Control Protocol/Internet Protocol (TCP/IP) options. In this case, the length of IP and TCP headers in the present embodiment are fixed at 20 bytes each. Based on this, the descriptor will assume a format having a field of one or more control words, followed by a descriptor address field which is followed by a descriptor length field.

Referring still to FIG. 2, descriptor download DMA circuit 204 retrieves the descriptors located within host memory 106. Specifically, once descriptor download DMA circuit 204 detects a difference between its read pointer and the software controlled write pointer, it initiates bus master DMA operation to download all of the available descriptors located in host memory 106 over PCI bus 102. It is appreciated that descriptor download DMA circuit 204 is coupled to a descriptor queue 206. Upon retrieving the descriptors from host memory 106, descriptor download DMA circuit 204 transmits them to descriptor queue 206 to be temporarily stored. It should be appreciated that descriptor queue 206 of the present embodiment is a first-in-first-out (FIFO) memory device. Furthermore, descriptor queue 206 is coupled to a TCP segmentation state machine 208. Moreover, descriptor queue 206 serves an empty flag along with the stored descriptors to TCP segmentation state machine 208.

Upon receiving the descriptors, TCP segmentation state machine 208 of the present embodiment determines if the data file (payload) corresponding to the descriptors stored within host memory 106 needs to be TCP segmented into Ether frames. If the data file does not need TCP segmentation, TCP segmentation state machine 208 reconstructs the received descriptors into a format defined for hardware queues 210 and 224. Conversely, if the data file needs TCP segmentation, TCP segmentation state machine 208 creates another set of descriptors wherein each descriptor describes a fragment or a segment of the data file. In other words, the data file stored within host memory 106 is virtually segmented down into a number of frames. Within the present embodiment, each of the descriptors created by TCP segmentation state machine 208 is going to contain a pointer to a location in host memory 106 where a reusable "template" for the IP header is stored. Furthermore, each descriptors is also going to contain a pointer to a location in host memory 106 where a reusable "template" for the TCP header is stored. Additionally, each of the descriptors would also include a control word along with pointers to where the data file (payload) is stored within host memory 106. Also, each descriptor contains a pointer to a location in host memory 106 where a reusable template for the Medium Access Control (MAC) header is stored. These descriptors are then transmitted by TCP segmentation state machine 208 to hardware queues 210 and 224 for temporary storage. It should be appreciated that the templates for the TCP, IP, and frame headers are created by host driver 202 and are used for every segment. It should be further appreciated that the present embodiment is well suited to operate without the templates described above.

More specifically, upon receiving the descriptors, TCP segmentation state machine 208 of FIG. 2 extracts the control fields from the descriptors. If TCP segmentation is not needed, TCP segmentation state machine 208 reconstructs the descriptors into a format defined for a data download DMA circuit 212. It is appreciated that TCP segmentation state machine 208 is coupled to hardware queues 210 and 224. As such, TCP segmentation state machine 208 transmits the revised structure descriptors to hardware queues 210 and 224 where they are temporarily stored. This revised structure descriptor information stored within hardware queue 210 will subsequently be used by data download DMA circuit 212 to transfer data. If TCP segmentation is needed, TCP segmentation state machine 208 examines certain fields in the header and each fragment length, and performs TCP segmentation. The results are stored into hardware queues 210 and 224, as described above. It should be appreciated that if there are more than one data descriptor in the current TCP segment and one or more of them has a length of less that the maximum segment size (MSS), TCP segmentation state machine 208 of the present embodiment will combine these descriptors into one Ether frame, but not to exceed the MSS. This process is performed in order to achieve high efficiency and high performance. Furthermore, TCP segmentation state machine 208 of the present embodiment will not make the descriptors visible to data download DMA circuit 212 unless it constitutes a complete Ether frame, or any other type of transmission frame.

The reason TCP segmentation state machine 208 transmits the revised structure descriptors to hardware queue 224 of a translator module 232 will be described in detail below.

TCP segmentation state machine 208 of FIG. 2 also saves the following information into the descriptor structure (not shown) of hardware queues 210 and 224. The information stored within hardware queue 210 is later used by a TCP/IP header modification state machine 214. Specifically, TCP segmentation state machine 208 stores a totalLength[15:0] which includes information for the field of Total_Length in the IP header. The totalLength is a summation of the length of the payload, the length of the IP header, and the length of the TCP header. It should be appreciated that the totalLength excludes the Medium Access Control (MAC) header. TCP segmentation state machine 208 also stores a dontFragment which includes information for the field of Flags in the IP header. It should be appreciated that the dontFragment has to be set all the time. TCP segmentation state machine 208 also stores a sequenceNumber[31:0] which includes information for the field of Sequence_Number in the TCP header. It should be appreciated that the value for the first Ether frame is equal to the original value in the TCP header template. Furthermore, the value for the second Ether frame is equal to the value of the first frame plus the value of the payload length of the first frame, and so on.

Additionally, TCP segmentation state machine 208 also stores push and fin (finish) flags which include information for the flags of PUSH and FIN, respectively, in the TCP header. It should be appreciated that for intermediate frames, these flags are cleared. It should be further appreciated that these flags are set for the last Ether frame of the current TCP segment. TCP segmentation state machine 208 also stores the Identification (ID) field in the IP header, which is incremented for each frame. TCP segmentation state machine 208 also stores the lastFragment flag in the IP header, which is set at the last frame. It should be appreciated that the TCP segmentation state machine 208 of the present embodiment is well suited to perform segmentation for any type of transmission protocol.

Hardware queues 210 and 224 temporarily store the descriptors and the information described above, received from TCP segmentation state machine 208. It should be appreciated that hardware queues 210 and 224 of the present embodiment are first-in-first-out (FIFO) memory devices. It should be further appreciated that hardware queues 210 and 224 can be implemented either with on-chip or off-chip memory with respect to NIC 118. One of the advantages of having hardware queues 210 and 224 located on-chip is that the restructure/segmentation process takes much less time than the off-chip alternative. Furthermore, the on-chip alternative would minimize access to the memory sub-system. It is appreciated that hardware queue 210 is coupled to data download DMA circuit 212. As such, hardware queue 210 transmits the stored information described above to data download DMA circuit 212.

With reference still to FIG. 2, data download DMA circuit 212 utilizes the descriptors to retrieve and download the data file, TCP templates, IP templates, and frame header stored within host memory 106. It should be appreciated that the templates stored within host memory 106 are reused for each segment of the data file because the structure is the same, but some information is modified later in the process and is described below. In other words, data download DMA circuit 212 receives the descriptor information from hardware queue 210 and uses it to retrieve the actual data stored within host memory 106. It is appreciated that data download DMA circuit 212 is coupled to primary PCI bus 102. It should be further appreciated that data download DMA circuit 212 extracts certain fields in the descriptor structure and makes them available to other modules. For example, data download DMA circuit 212 passes fragSize, last fragment, sequence number, etc. to TCP/IP header modification state machine 214, which is described in detail below.

The primary function of TCP/IP header modification state machine 214 is to insert the correct information (e.g., sequence number) into the TCP and IP template headers on-the-fly while the data is being transmitted by data download DMA circuit 212 toward a transmit (Tx) FIFO memory device 218. Specifically, TCP/IP header modification state machine 214 operates in a synchronized mode with data download DMA circuit 212. That is, when data download DMA circuit 212 starts transmitting data and TCP segmentation is enabled, TCP/IP header modification state machine 214 scans the data stream appearing at the input terminal of Tx FIFO memory device 218 and modifies on-the-fly the totalLength, dontFragment, sequenceNumber, push flag, fin flag, identification field, and lastFragment flag, which are described above with reference to TCP segmentation state machine 208. It should be appreciated that TCP/IP header modification state machine 214 alters the data fields for several locations of TCP and IP headers, which circuit implementation is described below with reference to FIG. 3. The importance of this task is to guarantee frame integrity and correct information for TCP/IP checksum circuit 216, so checksum circuit 216 can generate valid computations. It is appreciated that data download DMA circuit 212 is coupled to TCP/IP header modification state machine 214.

The TCP/IP header modification state machine 214 and data download DMA circuit 212 are each coupled to a byte packing and alignment circuit 215. It is well known that when data download DMA circuit 212 reads the data from host memory 106, the data can be located in fragments at disjointed addresses. As such, data download DMA circuit 212 transmits the data to byte packing and alignment circuit 215 in order for it to align the data into aligned words (e.g., 8 byte words). Within the present embodiment, it is appreciated that the function performed by byte packing and alignment circuit 215 is specific for the design of Tx FIFO memory device 218. In other words, byte packing and alignment circuit 215 receives data from data download DMA circuit 212 and TCP/IP modification state machine 214 and shifts the data around in order to properly align it for reception by Tx FIFO memory device 218. It should be appreciated that byte packing and alignment is well known by those of ordinary skill in the art.

Still referring to FIG. 2, checksum circuit 216 is used for providing a process of error detection for a receiver device coupled to network 120, which eventually receives the data transmitted by NIC 118. It should be appreciated that the process of checksumming is well known by those of ordinary skill in the art. Specifically, checksum circuit 216 of the present embodiment views the received data stream from byte packing and alignment circuit 215 as 16 bit integers which it sums. For example, there is a checksum on the IP header which basically checksums those 20 bytes. The checksum is a 2 byte value which is placed into a field in the IP header. Furthermore, there is a checksum calculated on a pseudo header, plus the TCP header, plus the payload. Once calculated, the checksum is placed into a field in the TCP header. The data is then transmitted to Tx FIFO memory device 218. Checksum circuit 216 is coupled between byte packing and alignment circuit 215 and Tx FIFO memory device 218. It should be appreciated that the checksum circuit 216 of the present embodiment can alternatively be coupled between Tx FIFO memory device 218 and a local memory device 220.

The Tx FIFO memory device 218 of the present embodiment receives the data from checksum circuit 216 and byte packing and alignment circuit 215 and temporarily stores it. It should be appreciated that Tx FIFO memory device 218 of the present embodiment is a first-in-first-out (FIFO) memory device. It is further appreciated that Tx FIFO memory device 218 is coupled to local memory device 220. As such, Tx FIFO memory device 218 subsequently transmits the stored data to local memory device 220 to be stored. A Medium Access Control (MAC) circuit 140 of the present embodiment is coupled to local memory device 220. The data remains stored within local memory device 220 until MAC circuit 140 has the capability to retrieve it.

It should be appreciated that the reason for TCP segmentation state machine 208 to transmit the descriptors and other information to hardware queue 224 of translator module 232 is to enable the subsequent translation of the descriptors from one format to another format. The primary function of translator module 232 is to translate the descriptors created by TCP segmentation state machine 208 into descriptors which are compatible with MAC circuit 140. In this fashion, NIC 118 can be used with different MAC circuits which operate using descriptors of different formats. In order for any particular MAC circuit to operate properly on NIC 118, software code is written to run on processor 226 which translates the descriptors created by TCP segmentation state machine 208 into descriptors which are compatible with the particular MAC circuit located on NIC 118. It should be appreciated that if MAC circuit 140 does not receive descriptors in the proper format, MAC circuit 140 is unable to access the data stored within local memory 220 which is to be transmitted over network 120 by NIC 118.

Referring still to FIG. 2, hardware queue 224 receives the descriptors and information from TCP segmentation state machine 208, as described above. It should be appreciated that hardware queue 224 operates in a similar manner as hardware queue 210, described above. Hardware queue 224 is coupled to processor 226. As such, hardware queue 224 transmits the stored descriptor information described above to processor 226. Processor 226 translates the received descriptors from one format into another format. For example, MAC circuit 140 wants to receive descriptors that have the address field followed by the length field, but TCP segmentation state machine 208 creates descriptors with the length field followed by the address field. As such, processor 226 changes the order of the address and length fields of the received descriptors in order to put them into the compatible format for MAC circuit 140. The translated descriptors are then transmitted by processor 226 to MAC dependent queue 228 for temporary storage. It is appreciated that processor 226 is coupled to MAC dependent queue 228.

MAC dependent queue 228 is coupled to MAC circuit 140 via a bus 230. It should be appreciated that MAC dependent queue 228 is implemented within the present embodiment as a first-in-first-out (FIFO) memory device. MAC dependent queue 228 outputs the translated descriptors to MAC circuit 140. Upon receiving the translated descriptors, MAC circuit 140 is able to access the data stored within local memory 220. MAC circuit 140 uses the translated descriptors to retrieve the stored data from local memory device 220 in preparation for transmitting it over network 120. It should be appreciated that MAC circuit 140 arbitrates for use of network 120 and then transmits the data over the network 120.

It should be appreciated that by using processor 226 to perform the translation from one descriptor format into another descriptor format, as described above, it allows NIC 118 to be used with a very wide variety of MAC circuits. In other words, all of the circuitry located on NIC 118, except MAC circuit 140, can be reused with any type of MAC circuit. As such, the amount of time to produce a new and different NIC is significantly reduce because it doesn't have to be designed and built from scratch. Instead, the present embodiment standardizes a great majority of the NIC circuitry.

It should be further appreciated that the descriptor translation function performed by processor 226 of translator module 232 can be implemented in a wide variety of ways. For example, instead of using processor 226, a state machine can be built to translate a particular descriptor format into another descriptor format. As such, the state machine is designed prior to fabrication of NIC 118 and it typically would only operate with a specific MAC circuit. Furthermore, processor 226 can be implemented to translate descriptors for a particular list of MAC circuits. As such, different software code segments are created to cause processor 226 to do the translation for all the MAC circuits on the particular list. When a particular MAC circuit is implemented on NIC 118, the specific code segment that corresponds to that MAC circuit is enabled during the fabrication of NIC 118. Additionally, it should be appreciated that the function of translating a particular descriptor format into another descriptor format of the present embodiment can be performed by many different types of circuitry.

Figure 3:
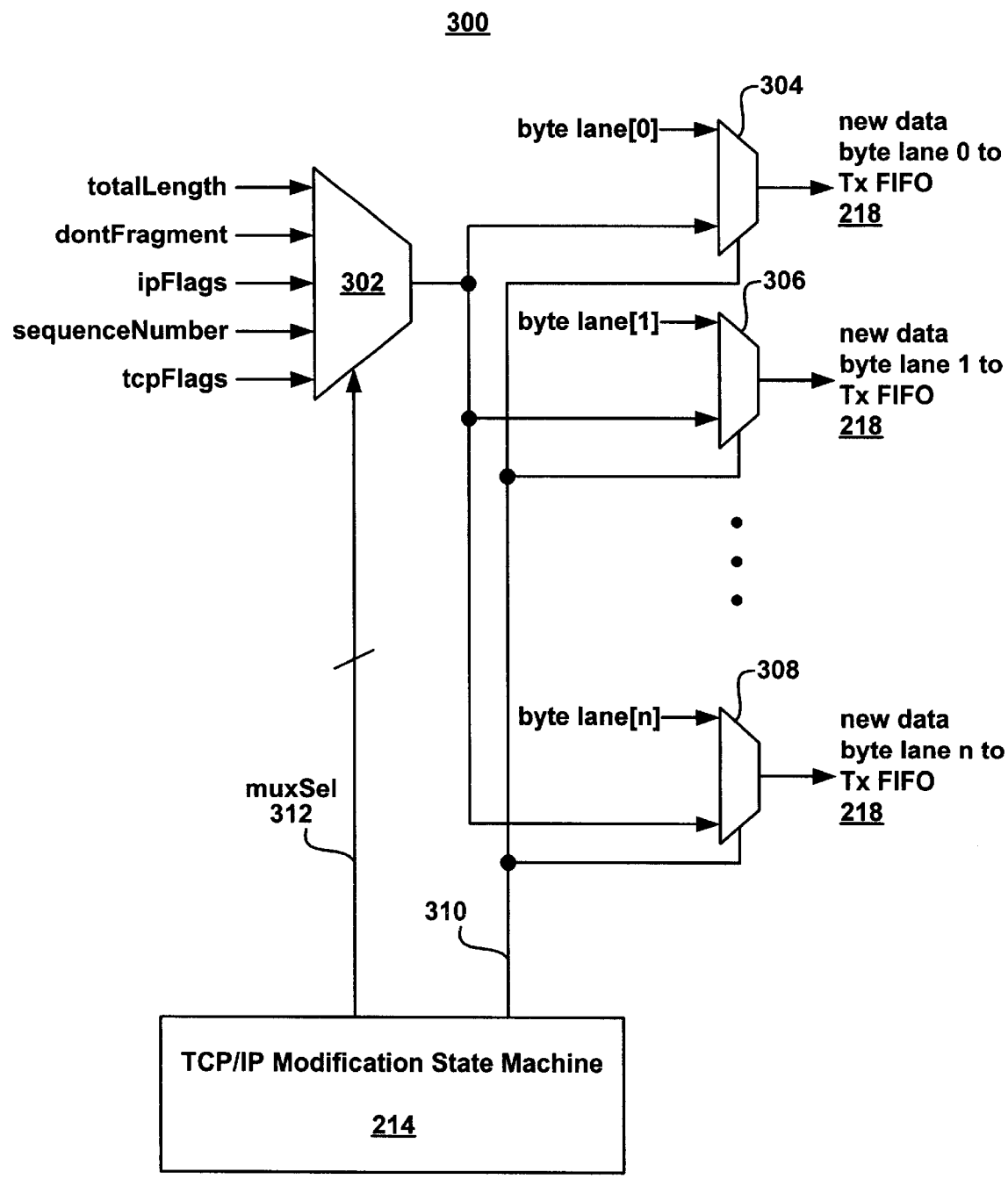
FIG. 3 is a block diagram of circuitry of the TCP/IP header modification state machine of FIG. 2 which alters the data fields of TCP and IP headers in accordance with one embodiment of the present invention.

Referring now to FIG. 3, which is a block diagram of a circuitry 300 of TCP/IP header modification state machine 214 which alters the data fields for several locations of TCP and IP headers. As previously mentioned, the importance of this task is to guarantee frame integrity and correct information for TCP/IP checksum circuit 216, so the checksum circuit 216 can generate valid computations. Specifically, multiplexer (MUX) 302 of the present embodiment of TCP/IP header modification state machine 214 receives the totalLength, dontFragment, ipFlags, sequenceNumber, and tcpFlags signals from data download DMA 212, as described above. Furthermore, MUX 302 is coupled to receive a muxSel signal 312 from other circuitry of TCP/IP header modification state machine 214. Additionally, the output of MUX 302 is coupled to an input terminal of MUXs 304, 306 and 308.

In operation, circuitry 300 of TCP/IP header modification state machine 214 controls which specific information within the TCP and IP headers is corrected by asserting different values of the muxSel signal 312 to MUX 302. In this manner, a different signal (e.g., totalLength) is transmitted to the inputs of MUXs 304, 306 and 308. It should be appreciated the other input terminals of MUXs 304, 306 and 308 are coupled to each receive a single specific byte lane which are output by byte packing and alignment circuit 215 (FIG. 2) toward Tx FIFO memory device 218. Furthermore, other circuitry of TCP/IP header modification state machine 214 also controls the output of MUXs 304, 306 and 308 by asserting a high or low signal over line 310. Therefore, TCP/IP header modification state machine 214 is able to control where the correct information is inserted into the TCP and IP headers. In this fashion, TCP/IP header modification state machine 214 outputs new byte lanes which are subsequently received by Tx FIFO memory device 218.

Figure 4:
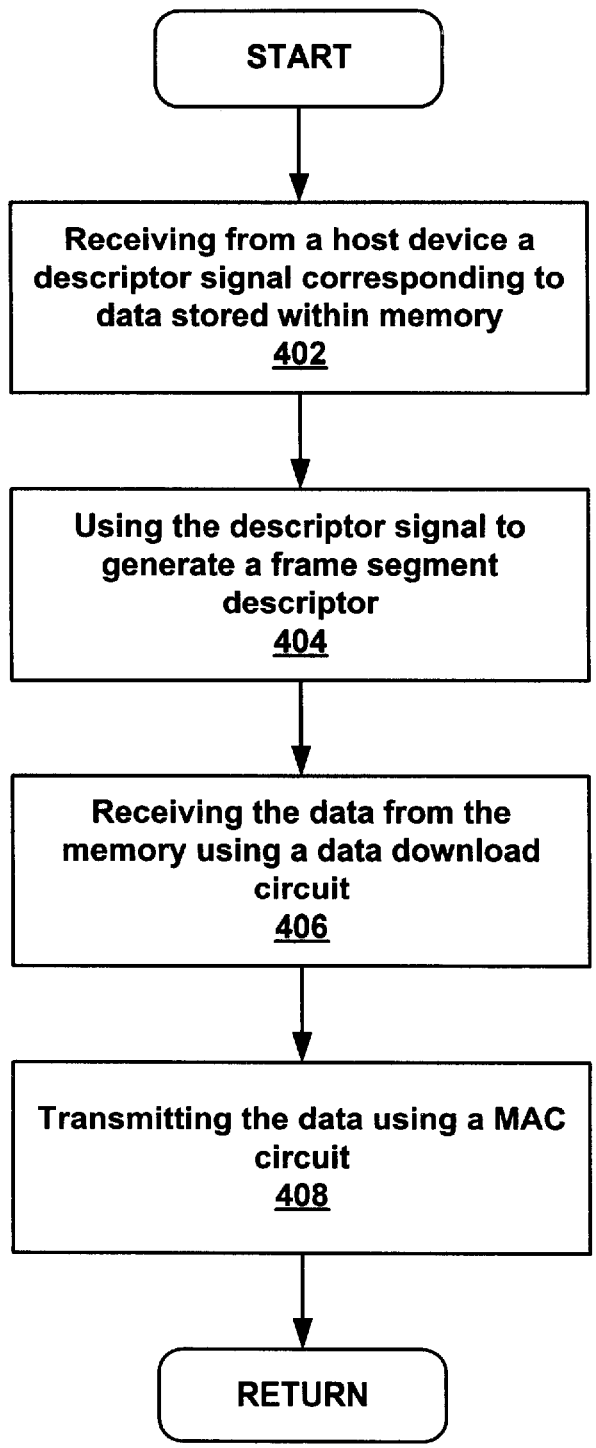
FIG. 4 is a flowchart of steps performed in accordance with one embodiment of the present invention for performing a transmission control protocol (TCP) segmentation process within hardware.

With reference to FIG. 4, a flowchart 400 of steps performed in accordance with one embodiment of the present invention for performing a transmission control protocol (TCP) segmentation process within hardware is shown. Flowchart 400 includes processes of the present invention which, in one embodiment, are carried out by a processor and electrical components under the control of computer readable and computer executable instructions. The computer readable and computer executable instructions reside, for example, in data storage features such a computer usable volatile memory 106 and/or computer usable non-volatile memory 108 of FIG. 1. Although specific steps are disclosed in flowchart 400 of FIG. 4, such steps are exemplary. That is, the present invention is well suited to performing various other steps or variations of the steps recited in FIG. 4.

In step 402 of FIG. 4, in one embodiment of the present invention, a descriptor signal which corresponds to data stored within memory is received from a host device. It should be appreciated that the host device of the present embodiment can be a computer or any other type of device.

At step 404, within the present embodiment, a segmentation circuit of a network interface card uses the received descriptor signal to generate a frame segment descriptor. It should be appreciated that the frame segment descriptor of the present embodiment can be generated using a Transmission Control Protocol (TCP) segmentation process. Furthermore, the frame segment descriptor of the present embodiment can include a Internet Protocol (IP) header and a TCP header. It should be further appreciated that step 404 is described in more specific detail below with reference to FIG. 5.

In step 406 of FIG. 4, within the present embodiment, a data download circuit receives the data from the memory. It should be appreciated that the data download circuit uses the frame segment descriptor to retrieve the data from memory.

At step 408, in one embodiment of the present invention, a Medium Access Control (MAC) circuit of the network interface card transmits the data. It should be appreciated that the MAC circuit can transmit the data over a network. After completing step 408, the present embodiment of flowchart 400 is exited.

Figure 5:
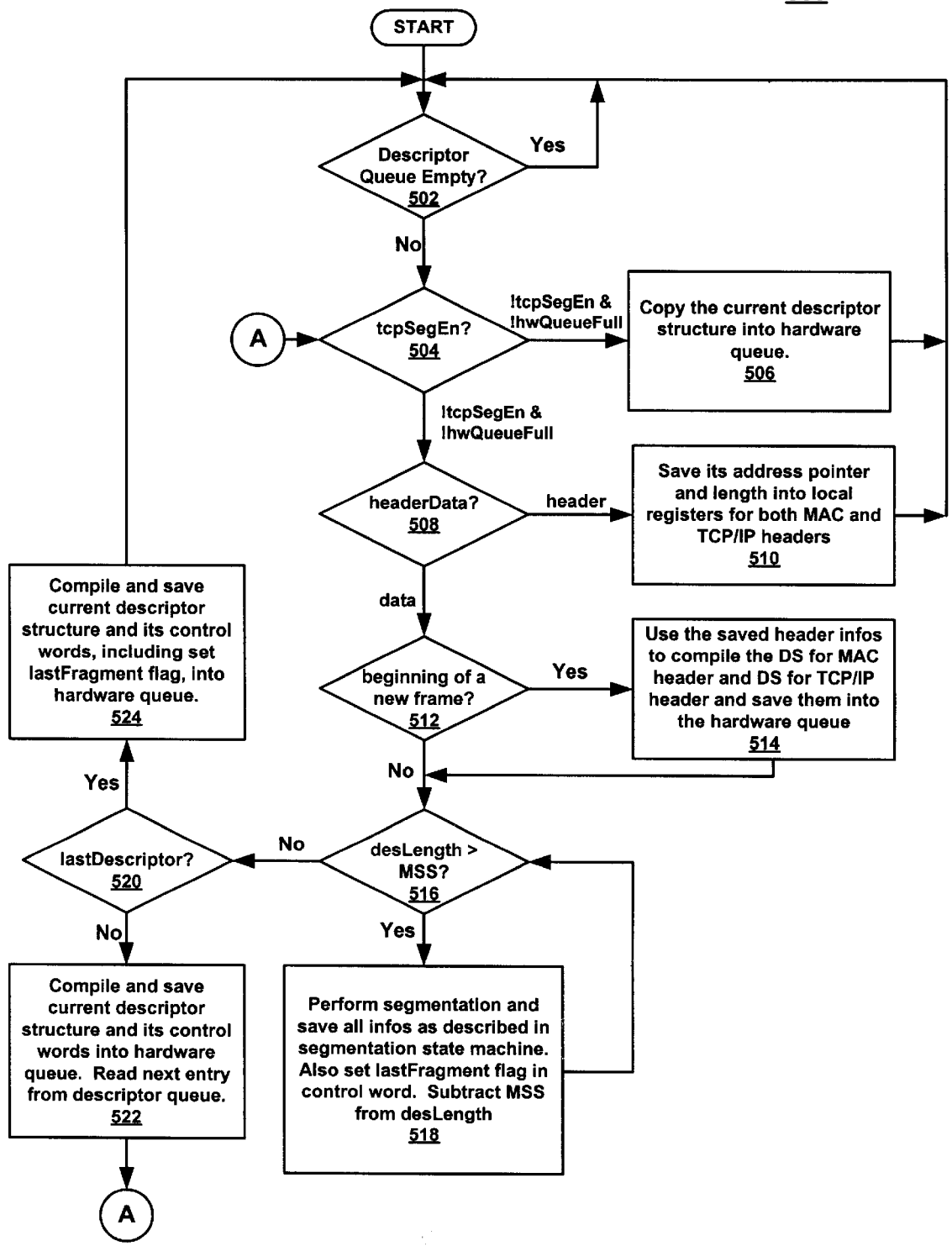
FIG. 5 is a flowchart of steps performed in accordance with one embodiment of the present invention for using a descriptor signal to generate a frame segment descriptor within hardware.

Referring now to FIG. 5, a flowchart 500 of steps performed in accordance with one embodiment of the present invention for using a descriptor signal to generate a frame segment descriptor within hardware is shown. Flowchart 500 includes processes of the present invention which, in one embodiment, are carried out by a processor and electrical components under the control of computer readable and computer executable instructions. The computer readable and computer executable instructions reside, for example, in data storage features such a computer usable volatile memory 106 and/or computer usable non-volatile memory 108 of FIG. 1. Although specific steps are disclosed in flowchart 500 of FIG. 5, such steps are exemplary. That is, the present invention is well suited to performing various other steps or variations of the steps recited in FIG. 5.

In step 502 of FIG. 5, the present embodiment determines whether a descriptor queue circuit (e.g., 206) is empty. If the descriptor queue circuit is empty, the present embodiment proceeds to the beginning of step 502. If the descriptor queue circuit is not empty, the present embodiment proceeds to step 504.

At step 504, the present embodiment determines whether a TCP segmentation enable (tcpSegEn) flag is asserted. If the tcpSegEn flag is not asserted (!tcpSegEn) and a hardware queue circuit (e.g., 210) is not full (!hwQueueFull), the present embodiment proceeds to step 506. If the tcpSegEn flag is asserted (tcpSegEn) and the hardware queue circuit is not full (!hwQueueFull), the present embodiment proceeds to step 508.

In step 506 of FIG. 5, the present embodiment copies the current descriptor structure into the hardware queue. Upon completion of step 506, the present embodiment proceeds to step 502.

At step 508, the present embodiment determines whether the current descriptor is a header descriptor or a data descriptor using a headerData flag. If the current descriptor is a header descriptor, the present embodiment proceeds to step 510. If the current descriptor is a data descriptor, the present embodiment proceeds to step 512.

In step 510, the present embodiment saves the address pointer and length of the current descriptors into local registers for both MAC and TCP/IP headers. Upon completion of step 510, the present embodiment proceeds to step 502.

At step 512 of FIG. 5, the present embodiment determines if the current descriptor is the beginning of a new frame. If the current descriptor is the beginning of a new frame, the present embodiment proceeds to step 514. If the current descriptor is not the beginning of a new frame, the present embodiment proceeds to step 516.

In step 514, the present embodiment uses the saved header information in order to compile the descriptor structure (DS) for the MAC header and the descriptor structure for the TCP/IP header, which are then saved into the hardware queue circuit. Upon completion of step 514, the present embodiment proceeds to step 516.

At step 516, the present embodiment determines whether the length of the current descriptor (desLength) is greater than the maximum segment size (MSS). If the length of the current descriptor is greater than the maximum segment size, the present embodiment proceeds to step 518. If the length of the current descriptor is not greater than the maximum segment size, the present embodiment proceeds to step 520.

In step 518 of FIG. 5, the present embodiment performs segmentation and saves all the information as described above with reference to the segmentation station machine 208 of FIG. 2. Furthermore, the present embodiment sets the lastFragment flag in the control word and also subtracts the value of the maximum segment size (MSS) from the length of the current descriptor (desLength) during step 518. Upon completion of step 518, the present embodiment proceeds to step 516.

At step 520, the present embodiment determines whether the current descriptor has the last descriptor (lastDescriptor) flag asserted indicating it is the last descriptor for the current TCP segment. If the current descriptor is the last descriptor of the current TCP segment, the present embodiment proceeds to step 524. If the current descriptor is not the last descriptor of the current TCP segment, the present embodiment proceeds to step 522.

In step 522, the present embodiment compiles and saves the current descriptor structure and its control words into the hardware queue. Furthermore, the present embodiment reads the next entry from the descriptor queue during step 522. Upon completion of step 522, the present embodiment proceeds to step 504.

At step 524, the present embodiment compiles and saves the current descriptor structure and its control words, including the set lastFragment flag, into the hardware queue. Upon completion of step 524, the present embodiment proceeds to step 502.

Figure 6:
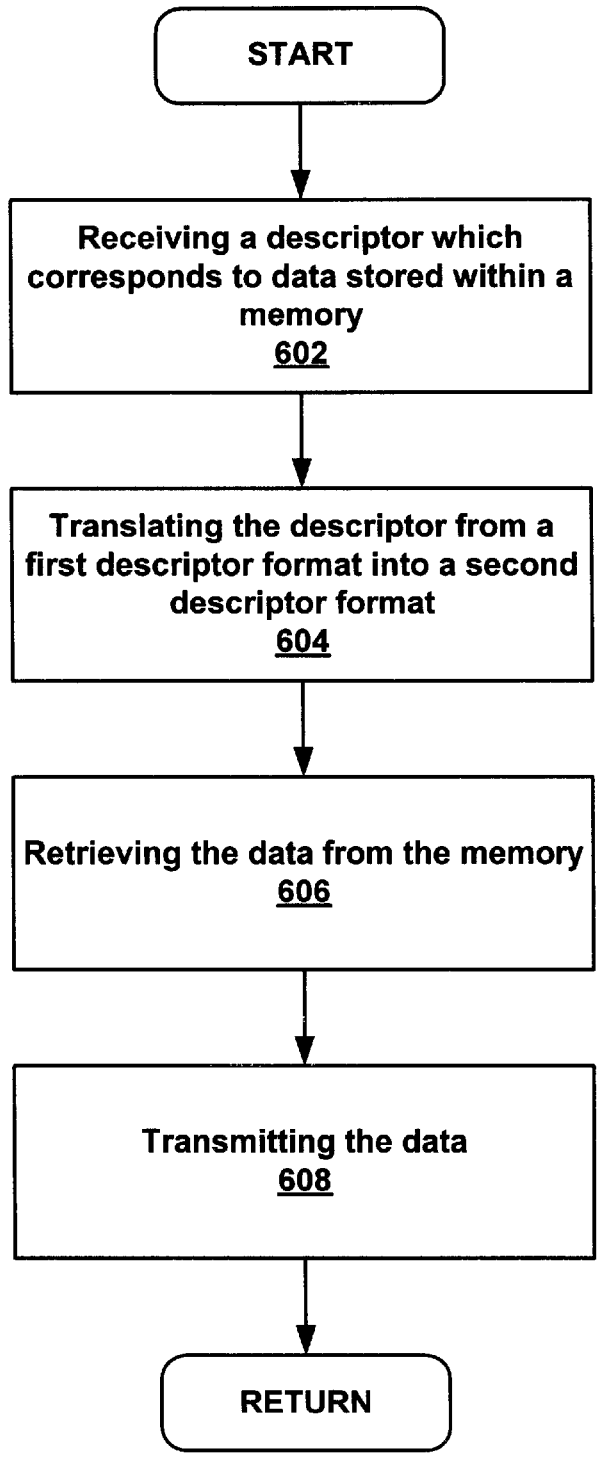
FIG. 6 is a flowchart of steps performed in accordance with one embodiment of the present invention for translating a medium access control (MAC) descriptor from a first descriptor format into a second descriptor format.

With reference now to FIG. 6, a flowchart 600 of steps performed in accordance with one embodiment of the present invention for translating a medium access control (MAC) descriptor from a first descriptor format into a second descriptor format is shown. Flowchart 600 includes processes of the present invention which, in one embodiment, are carried out by a processor and electrical components under the control of computer readable and computer executable instructions. The computer readable and computer executable instructions reside, for example, in data storage features such a computer usable volatile memory 106 and/or computer usable nonvolatile memory 108 of FIG. 1. Although specific steps are disclosed in flowchart 600 of FIG. 6, such steps are exemplary. That is, the present invention is well suited to performing various other steps or variations of the steps recited in FIG. 6.

In step 602 of FIG. 6, in one embodiment of the present invention, a descriptor signal which corresponds to data stored within a memory to be transmitted by a network interface card is received.

At step 604, within the present embodiment, the received descriptor is translated from a first descriptor format into a second descriptor format. It should be appreciated that the translation of the descriptor can be performed within the present embodiment by a processor circuit, a state machine, or any other type of circuitry.

In step 606 of FIG. 6, within the present embodiment, the data is retrieved from the memory. It should be appreciated that the retrieving of the data can be performed within the present embodiment by a medium access control (MAC) circuit or any other type of circuitry.

At step 608, in one embodiment of the present invention, the data is then transmitted. It should be appreciated that the transmitting of the data can be performed within the present embodiment by a medium access control (MAC) circuit, an application specific integrated circuit (ASIC), the network interface card, or any other type of circuitry. Furthermore, it should be further appreciated that the data can be transmitted over a network within the present embodiment. After completing step 608, the present embodiment of flowchart 600 is exited.

Thus, the present invention provides a method and system for providing significantly improved data throughput of a network interface card which is used with a high speed network (e.g., gigabit levels). Moreover, the present invention achieves the above accomplishment and provides a descriptor which can be tailored to a corresponding MAC device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit for performing a transmission control protocol (TCP) segmentation on data of a host system to be transferred over a network, said circuit comprising:

a segmentation circuit coupled to receive a first descriptor from said host system which corresponds to said data stored within a host memory to be transferred over said network, as part of said transmission control protocol segmentation said segmentation circuit uses said first descriptor to generate a second descriptor that describes a segment of said data stored within said host memory and said second descriptor comprises a pointer to reuseable header data stored with said host memory associated with said segment of said data;

a data download circuit coupled to receive said second descriptor from said segmentation circuit and coupled to said host memory, said data download circuit utilizes said second descriptor to download said segment of said data from said host memory and said data download circuit utilizes said pointer to download said reuseable header data;
a local memory coupled to receive said segment of said data from said data download circuit, said local memory stores said segment of said data; and
a medium access control (MAC) circuit coupled to said local memory to retrieve said segment of said data and coupled to transfer said segment of said data over said network.

2. The circuit as described in claim 1 further comprising:
a translator circuit coupled to receive said second descriptor from said segmentation circuit, said translator circuit translates said second descriptor from a first descriptor format into a second descriptor format;
wherein said medium access control circuit coupled to said translator circuit to receive said second descriptor in said second descriptor format, said medium access control circuit uses said second descriptor in said second descriptor format to retrieve said segment of said data from said local memory.

3. The circuit as described in claim 2 wherein said translator circuit comprises a processor circuit for translating said second descriptor from said first descriptor format into said second descriptor format.

4. The circuit as described in claim 1 wherein said segmentation circuit comprises a state machine.

5. The circuit as described in claim 1 further comprising:
a header modification circuit coupled to receive said reuseable header data from said data download circuit and for altering said reuseable header data, wherein said local memory is coupled to receive altered header data from said header modification circuit.

6. The circuit as described in claim 5 wherein said header modification circuit comprises a state machine.

7. The circuit as described in claim 1 wherein said circuit is disposed on a peripheral component.

8. The circuit as described in claim 7 wherein said peripheral component is selected from a network interface card, a PCMCIA (personal computer memory card international association) card, a compact form factor I/O (input/output) card, a rate controller, a small computer system interface (SCSI) controller, and a graphics card.

9. A circuit for performing a transmission control protocol (TCP) segmentation on a data file of a host system to be transmitted over a network, said circuit comprising:
a segmentation state machine coupled to receive a first descriptor from said host system which corresponds to said data file stored by a host memory to be transmitted over said network, as part of said transmission control protocol segmentation said segmentation state machine uses said first descriptor to generate a second descriptor that describes a fragment of said data file stored within said host memory and said second descriptor comprises a pointer to reusable header data stored with said host memory associated with said fragment of said data file;
a data download circuit coupled to receive said second descriptor from said segmentation circuit and coupled to said host memory, said data download circuit utilizes said second descriptor to download said fragment of said data file from said host memory and said data download circuit utilizes said pointer to download said reuseable header data;
a local memory coupled to receive said fragment of said data file from said data download circuit, said local memory stores said fragment of said data file; and
a medium access control (MAC) circuit coupled to said local memory to retrieve said fragment of said data file and coupled to transmit said fragment of said data file over said network.

10. The circuit as described in claim 9 further comprising:
a translator circuit coupled to receive said second descriptor from said segmentation state machine, said translator circuit translates said second descriptor from a first descriptor format into a second descriptor format;
wherein said medium access control circuit coupled to receive said second descriptor in said second descriptor format from said translator circuit, said medium access control circuit utilizes said second descriptor in said second descriptor format to retrieve said fragment of said data file from said local memory.

11. The circuit as described in claim 10 wherein said translator circuit comprises a processor circuit for translating said second descriptor from said first descriptor format into said second descriptor format.

12. The circuit as described in claim 9 further comprising:
a header modification circuit coupled to receive said reusable header data from said data download circuit and for altering data of said reusable header data, wherein said local memory is coupled to receive altered header data from said header modification circuit.

13. The circuit as described in claim 12 wherein said header modification circuit comprises a state machine.

14. The circuit as described in claim 9 wherein said circuit is disposed on a peripheral component.

15. The circuit as described in claim 14 wherein said peripheral component is selected from a network interface card, a PCMCIA (personal computer memory card international association) card, a compact form factor I/O (input/output) card, a rate controller, a small computer system interface (SCSI) controller, and a graphics card.

16. The circuit as described in claim 9 wherein said circuit is disposed in a non-peripheral component.

17. A method for performing a transmission control protocol (TCP) segmentation on data of a host system to be transmitted over a network, said method comprising:
receiving a first descriptor from said host system which corresponds to said data stored within a host memory to be transmitted over said network;
utilizing said first descriptor to generate a second descriptor that describes a segment of said data stored within said host memory, as part of said transmission control protocol segmentation, and said second descriptor comprises a pointer to reusable header data stored with said host memory associated with said segment of said data;
utilizing said second descriptor to download said segment of said data from said host memory;
utilizing said pointer to download said reusable header data stored with said host memory associated with said segment of said data;
storing said segment of said data downloaded from said host memory with a local memory;
retrieving said segment of said data from said local memory using a medium access control (MAC) circuit; and
transmitting said segment of said data over a network with said medium access control circuit.

18. The method as described in claim 17 further comprising:
translating said second descriptor from a first descriptor format into a second descriptor format,
wherein said retrieving said segment of said data from said local memory further comprises utilizing said second descriptor in said second descriptor format to retrieve said segment of said data.

19. The method as described in claim 17 wherein said utilizing said first descriptor to generate a second descriptor is performed by a state machine.

20. The method as described in claim 17 further comprising:
modifying data of said reusable header data to produce altered header data.

21. The method as described in claim 20 further comprising:
storing said altered header data with said local memory.

22. The method as described in claim 20 wherein said modifying data of said reusable header data is performed by a header modification circuit.

23. The method as described in claim 22 wherein said header modification circuit comprises a state machine.

24. The method as described in claim 17 wherein said method is performed by a peripheral component.

25. The method as described in claim 24 wherein said peripheral component is selected from a network interface card, a PCMCIA (personal computer memory card international association) card, a compact form factor I/O (input/output) card, a rate controller, a small computer system interface (SCSI) controller, and a graphics card.

* * * * *